United States Patent [19]

Endo et al.

[11] 4,097,864
[45] Jun. 27, 1978

[54] RADAR-OPERATED VEHICLE SAFETY APPARATUS

[75] Inventors: Hiroshi Endō, Yokosuka; Kazuhiro Ban, Amagasaki, both of Japan

[73] Assignees: Nissan Motor Company, Limited, Yokohama; Mitsubishi Denki Kabushiki Kaisha, Tokyo, both of Japan

[21] Appl. No.: 786,828

[22] Filed: Apr. 12, 1977

[30] Foreign Application Priority Data

Apr. 12, 1976  Japan ............................... 51-40381

[51] Int. Cl.² ................................................ G01S 9/42
[52] U.S. Cl. ................................................ 343/7 VM
[58] Field of Search ................................... 343/7 VM

[56] References Cited

U.S. PATENT DOCUMENTS

| | | | |
|---|---|---|---|
| 3,420,572 | 1/1969 | Bisland | 343/7 VM X |
| 3,725,921 | 4/1973 | Weidman et al. | 343/7 VM |
| 3,898,652 | 8/1975 | Rashid | 343/7 VM X |
| 3,952,301 | 4/1976 | Sorkin | 343/7 VM |

*Primary Examiner*—Malcolm F. Hubler
*Attorney, Agent, or Firm*—Bacon & Thomas

[57] ABSTRACT

The apparatus of the invention comprises a radar device for measuring the range of an object and the vehicle speed relative to the object, and a vehicle speed sensor for measuring the vehicle roadway speed. A first computing circuit is provided to set up a first minimum distance allowed for the vehicle when approaching a stationary object and a second computing circuit for setting up a second minimum distance allowed for the vehicle approaching an object moving ahead of the vehicle. An alarm will be given either when the range of the stationary object reaches the first minimum distance or that of the moving object reaches the second minimum distance.

6 Claims, 2 Drawing Figures

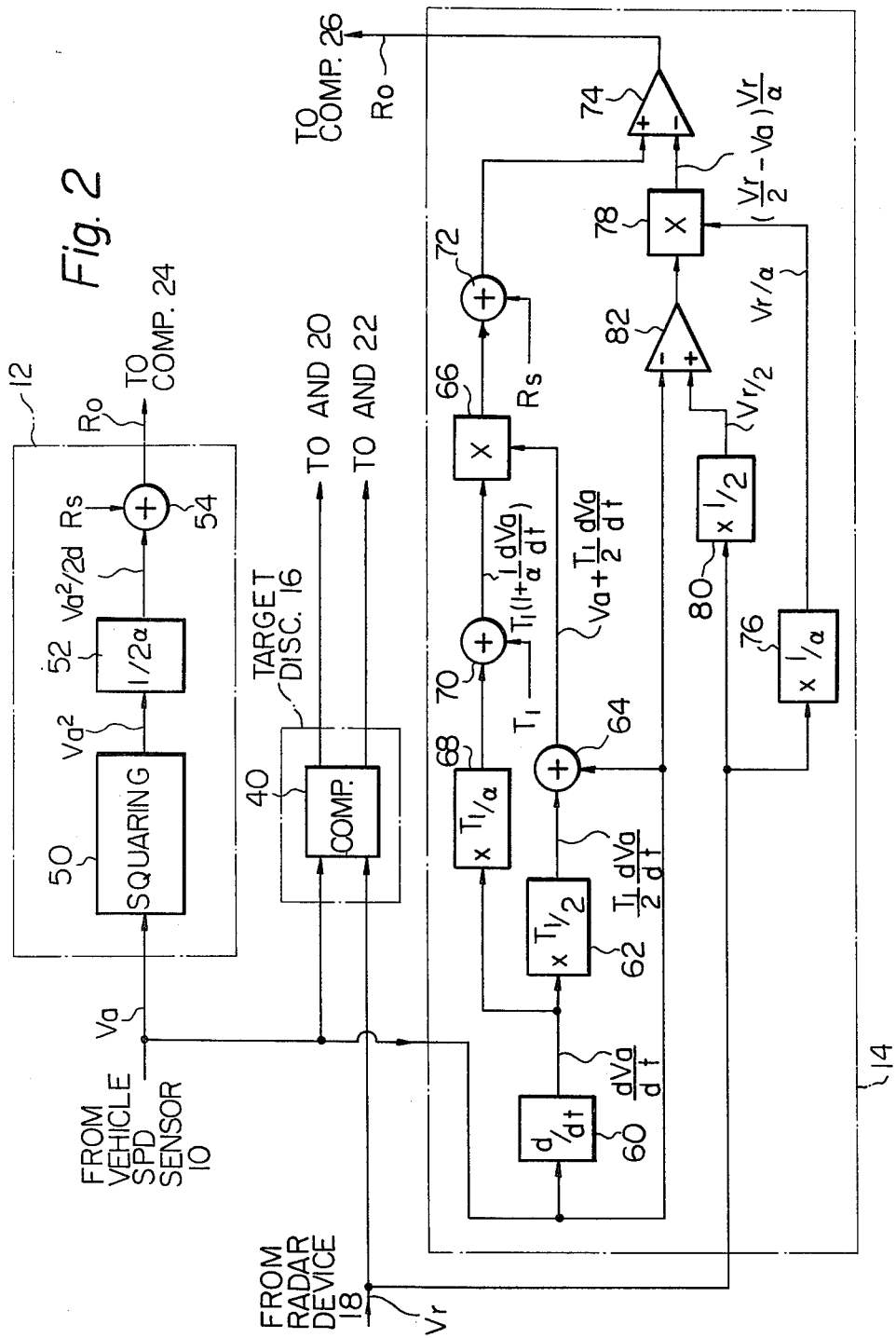

RADAR-OPERATED VEHICLE SAFETY APPARATUS

FIELD OF THE INVENTION

The present invention relates generally to radar-operated vehicle safety aparatus and in particular to such apparatus in which the detected objects are discriminated in terms of their speeds relative to the roadway so as to allow reduction of the minimum spacing between successively moving vehicles.

BACKGROUND OF THE INVENTION

Detection of objects by radar produces valid as well as invalid return signals. Prior art radar-operated braking systems provide discrimination between such valid and invalid signals based on the relative distance of the object and the signal intensity, and give an alarm only when the relative distance becomes smaller than a preset minimum distance, regardless of the rate of change of the distance between it and the object. From the safety standpoint, the preset minimum distance must be decided on the assumption that the detected object is stationary. However, if the detected object is one that moves in the same direction and at substantially the same speed as the vehicle, the brake will be operated unnecessarily before the vehicle is actually approaching that object at a dangerous speed.

SUMMARY OF THE INVENTION

An object of the invention is to provide an improved radar-operated vehicle safety apparatus which discriminates a detected object between a stationary object and an object moving in the same direction as the vehicle and provides first and second minimum, or safety limit distances for comparison with the detected range for the respective objects.

Another object of the invention is to provide radar-operated vehicle safety apparatus which avoids unnecessary operation of braking system so as to allow reduction of the relative distance between successively moving vehicles to a minimum interval.

A further object of the invention is to provide a radar-operated vehicle safety apparatus which avoids the congestion of vehicles on roadways by allowing them to keep minimum spacing therebetween.

BRIEF DESCRIPTION OF THE DRAWINGS

These and other objects, features and advantages of the present invention will be understood from the following description taken in conjunction with the accompanying drawings, in which:

FIG. 2 illustrates details of the circuit blocks of the embodiment of FIG. 1.

DESCRIPTION OF THE PREFERRED EMBODIMENT

Figure 1:
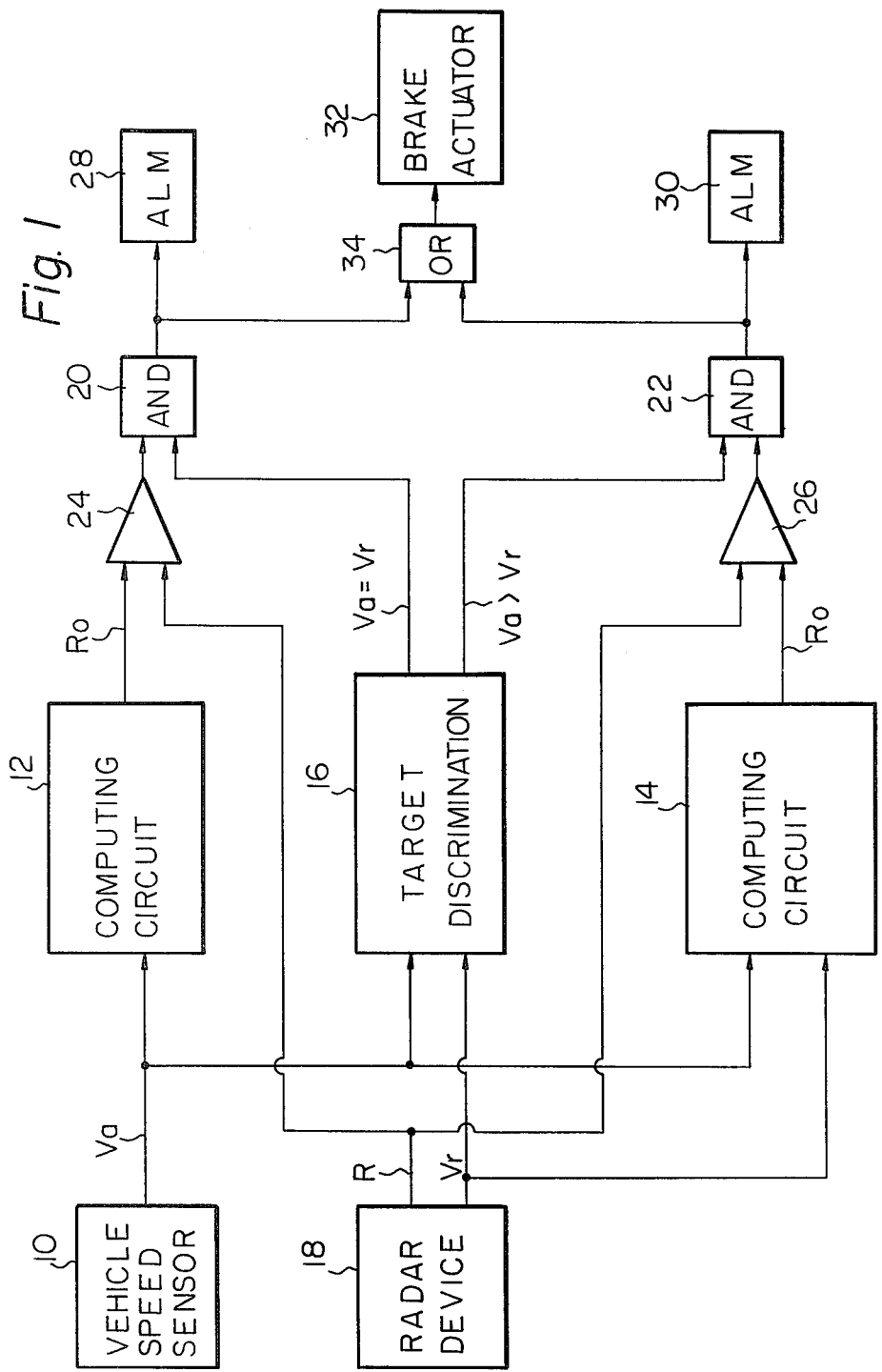
FIG. 1 is a circuit block diagram of an embodiment of the present invention.

A radar-operated vehicle safety assurance system of the invention is schematically illustrated in FIG. 1. A vehicle speed sensor 10 of conventional design is provided to measure the speed of the roadway vehicle relative to the roadway surface and generate a corresponding signal Va which is applied to a computing circuits 12 and 14 and also to a target discrimination circuit 16. A radar device 18 of conventional design is provided to furnish information as to the vehicle speed relative to a moving target such as preceding vehicle or stationary target such as signpost or guardrail, and as to the range of the detected target. The radar device 18 provides a signal Vr indicating the vehicle's relative speed to the target and a signal R indicating the the measured range.

The target discrimination circuit 16 receives the range signal R from the radar devide 18 and determines whether the target of interest is stationary or moving in the same direction as the vehicle, and enables an AND gate 20 when the target is stationary or AND gate 22 when the target is one that is moving. The range signal R is then compared in comparators 24 and 26 with the output from the computing circuits 12 and 14, respectively, and applied to AND gates 20 and 22.

The first computing circuit 12 processes the signal Va from the vehicle speed sensor 10 to derive a first minimum, or safety limit distance on the assumption that the detected object is stationary such that the vehicle under any possible conditions can safely decelerate to a stop with a marginal distance left between it and the object. The second computing circuit 14 processes the signals Va and Vr and derives a second minimum, or safety limit distance on the assumption that the detected object is moving such that the vehicle under any possible conditions can safely decelerate to a stop with a marginal distance left between it and the moving object which is also assumed to have been decelerated to a stop.

When the measured range of the object is equal to or smaller than the first safety limit distance, it is considered appropriate to alert the driver that the vehicle is approaching at a dangerous speed to a stationary object in front. Under such circumstances, the comparator 24 will deliver an output, and the AND gate 20 is enabled by the signal from the discrimination circuit 16 indicating that the object is stationary, to pass the output from the comparator to an alarming device 28 and also to a brake actuator 32 through an OR gate 34.

Likewise, when the measured range is equal to or smaller than the second safety limit distance, it is considered appropriate to give an alarm signal indicating that the vehicle is approaching a moving object at a dangerous speed. Under such circumstances, the comparator 26 will deliver an output, and the AND gate 22 is enabled by the discrimination circuit 16 to pass the output from the comparator 26 to the alarming device 28 and to the brake actuator 32.

The operation of the invention will be fully comprehended by the following description. When the signals $Va$ and $Vr$ will substantially be equal, the detected target can be recognized as a stationary object, and conversely when the signal $Va$ is greater than signal $Vr$, the detected target can be considered as a moving object. As illustrated in FIG. 2, the discrimination circuit 16 comprises a comparator 40 which discriminates the types of objects by comparing the input signals $Va$ and $Vr$ and provides an output to one of the AND gates 20 and 22 depending upon the result of the comparison.

Assuming that the detected target is a stationary object, and the vehicle running at a speed $Va$ is assumed to have been decelerated at a rate of $\alpha$ to a speed $Vat$ after the elapse of an interval "$t$". Since $Vat = Va - \alpha t$, the time $T_1$ taken to stop the vehicle is $Va/\alpha$ and the distance Rat travelled by the vehicle during deceleration is $$Vat - \frac{1}{2} \alpha t^2 = \frac{1}{2\alpha} Va^2.$$

Assume that the vehicle come to a stop with a safety margin $Rs$ left between it and the stationary object, and let $Ro$ to denote the distance between the two at the instant when brake pedal is depressed, the following relation should hold:

$$Ro - \frac{1}{2\alpha} Va^2 \geq Rs \quad (1)$$

from Equation (1) it will be appreciated that a warning signal should be given at the instant when the vehicle speed has decreased and the detected range R has reached a minimum distance represented by $Ro=(1/2\alpha) Va^2 + Rs$. The computing circuit 12 is designed to find the minimum distance value $Ro$ by computing the input data applied thereto from vehicle speed sensor 10.

The computing circuit 12 includes a squaring circuit 50 to provide an output representing $Va^2$ which is divided by $2\alpha$ in the division circuit 52 to provide an output $Va^2/2\alpha$. An adder 54 is connected to the output of divider 52 to add a voltage representing the value of $Rs$ to the output from the divider 52. The comparator 24 receives the output from the adder 54 for comparison with the detected range signal R and provides an output only when the output from the computing circuit 12 is reached.

Consider next a situation in which the detected target is a vehicle ahead which is assumed to have been moving at a speed of $Vb$ relative to the roadway surface in the same direction as the vehicle behind and decelerated until it comes to a stop. Let $Rb_1$ to represent the distance travelled by the preceding vehicle during the deceleration operation, then the distance $Rb_1$ is given by $(1/2\alpha)Vb^2$.

Upon recognition of the deceleration operation, the driver in the following vehicle would immediately depress the brake pedal. There is however an inherent delay time $T_1$ before the vehicle actually begins to decelerate. Therefore, the distance $Ra_1$ travelled by the following vehicle during the time interval $T_1$ is given by:

$$Ra_1 = Va\, T_1 + \frac{1}{2} \frac{dVa}{dt} T_1^2 \quad (2)$$

Since the following vehicle starts deceleration at a speed $Va + (dVa/dt)T_1$, the distance $Ra_2$ travelled by the following vehicle from the instant it starts deceleration to the instant it comes to a halt, will be given by $$Ra_2 = \frac{1}{2\alpha} (Va + \frac{dVa}{dt} T_1)^2 \quad (3)$$

The safety margin $Ra$ is thus given by $$Rs \leq Ro + Rb_1 - (Ra_1 + Ra_2) \quad (4)$$

Since the speed of the following vehicle relative to the preceding one is $Vr = Va - Vb$, Equation (4) can be rewritten as follows:

$$Rs \leq Ro + \frac{1}{\alpha} Vr(\frac{1}{2} Vr - Va) - \quad (5)$$

-continued
$$T_1(1 + \frac{1}{\alpha} \frac{dVa}{dt})(Va + \frac{1}{2} T_1 \frac{dVa}{dt})$$

Therefore, it will be understood that an alarm should be given when the following condition is met:

$$Ro = Rs + T_1(1 + \frac{1}{\alpha} \frac{dVa}{dt})(Va + \frac{1}{2} T_1 \frac{dVa}{dt}) - \quad (6)$$
$$\frac{1}{\alpha} Vr(\frac{1}{2} Vr - Va)$$

Therefore, it is understood that $Ro$ is the minimum distance for the vehicle to be spaced from a moving object.

The computing circuit 14 is designed to compute Equation (6). In FIG. 2, the computing circuit 14 comprises a differentiator 60 connected to the vehicle speed sensor 10 to differentiate its output to produce $dva/dt$ which is multiplied by $T_1/2$ by a circuit 62 whose output is connected to an adder 64. The adder 64 provides summation of the two input signals applied thereto, one received from the multiplier 62 and the other from the vehicle speed sensor 10, the combined output being supplied to one input of a multiplier 66.

The differentiator 60 also supplies its output to multiplier 68 which multiplies the differentiated signal by $$\frac{T_1}{\alpha} \text{ to give } \frac{T_1}{\alpha} \frac{dVa}{dt}.$$

$T_1$ is then added to the output from the multiplier 68 in an adder 70 which supplies its output to the other input of the multiplier 66. In an adder 72 a voltage representing the safety margin $Rs$ is added to the output from multiplier 66 and the added output is fed to the noninverting input of a differential amplifier or subtractor 74.

On the other hand, a voltage $Rr$ representing the vehicle speed relative to the preceding one is applied to a multiplier or attenuator 76 where the input signal is multiplied by the factor of $1/\alpha$ and fed into an input of a multiplier 78. The voltage $Vr$ is also applied to a multiplier 80 to be multiplied by the factor of ½ and supplied to the noninverting input of a comparator or subtractor 82 for comparison with the output $Va$ from vehicle speed sensor 10 and thence to the other input of the multiplier 78 to be multiplied by the output $Vr/\alpha$ from the multiplier 76. The output from the multiplier 78 is fed to the inverting input of the subtractor 74 which subtracts the output of multiplier 78 from the output of adder 72. The output from the subtractor 74 is thus a representation of the value $Ro$ of Equation (6) and fed to the comparator 26 for comparison with the range representing signal R from the radar device 18, and if the former has reduced to a value equal to the latter the comparator 26 will provide an output through AND gate 22 to the alarm 30 as well as to the brake actuator 32 through OR gate 34.

Therefore, an alarm is given by the result of comparison between the actual and computed target ranges separately in respect of stationary and moving targets taking into account the safety marginal distance. The radar-operated braking system of the invention is thus operated by the valid signal which allows reduction of spacin between successively moving vehicles to a minimum without endangering safety.

What is claimed is:
1. A vehicle safety apparatus comprising:

a radar device for measuring the range of an object and the speed of the vehicle relative to said object;

a vehicle speed sensor for measuring the speed of the vehicle relative to the roadway;

means for determining whether said object is stationary or moving in the same direction as the vehicle;

a first computing circuit for processing the measured vehicle speed relative to the roadway to derive a first minimum distance on the assumption that said object is stationary;

a first comparator for comparing said measure range of said object with said first minimum distance to provide an output when said measured range is equal to or smaller than said first minimum distance;

a first gate circuit for passing said output from said first comparator to a utilization circuit when said object is determined as a stationary object;

a second computing circuit for processing said measured vehicle speeds relative to both the roadway and the object to derive a second minimum distance on the assumption that said object is moving;

a second comparator for comparing said measured range of said object with said second minimum distance to provide an output when said measured range is equal to or smaller than said second minimum distance; and a second gate circuit for passing said output from said second comparator to said utilization circuit when said object is determined as a moving object.

2. A vehicle safety apparatus as claimed in Claim 1, wherein said first computing circuit is constructed to provide an output representative of $$\frac{1}{2\alpha} V_a^2 + R_s,$$

where $\alpha$ represents the amount of deceleration of said vehicle; $Va$, the measured vehicle speed relative to said roadway and $R_s$, a safety distance left between said object and said vehicle when the vehicle has come to a stop.

3. A vehicle safety apparatus as claimed in claim 1, wherein said second computing circuit is constructed to provide an output which is representative of $$R_s + T_1(1 + \frac{1}{2} \frac{dVa}{dt})(Va + \frac{T_1}{2} \frac{dVa}{dt}) - \frac{Vr}{2}(\frac{Vr}{2} - Va)$$

where, $Rs$ is a safety distance left between said object and said vehicle when said vehicle has come to a stop; $T_1$, a time interval measured from the instance said object is recognized by an occupant in said vehicle to the instant said vehicle starts deceleration; $\alpha$, the amount of deceleration of said vehicle; $Va$, the measured vehicle's speed relative to said roadway; and $Vr$, the measured vehicle speed relative to said object 4. A vehicle safety apparatus as claimed in claim 1, wherein said determining means comprises a comparator for comparing said measured vehicle roadway speed with said measured vehicle speed relative to said object to provide a first output when both speeds are substantially equal and a second output when said roadway speed is greater than said relative speed, the first output being connected to said first gate circuit to pass said output from said first comparator and the second output being connected to said second gate circuit to pass said output from said second comparator.

5. A vehicle safety appratus as claimed in claim 1, wherein said utilization circuit includes a first and a second alarm devices respectively connected to said first and second gate circuits.

6. A vehicle safety apparatus as claimed in claim 1, wherein said utilization circuit includes a brake actuator responsive to said outputs from said first and second gate circuits.

* * * * *